US011927555B2

(12) United States Patent
Huang et al.

(10) Patent No.: US 11,927,555 B2
(45) Date of Patent: Mar. 12, 2024

(54) MICROMACHINED THERMAL TIME-OF-FLIGHT FLUIDIC CONCENTRATION METERING DEVICE

(71) Applicants: Liji Huang, Santa Clara, CA (US); Yahong Yao, San Jose, CA (US); Li Chen, San Jose, CA (US); Chih-Chang Chen, Cupertino, CA (US)

(72) Inventors: Liji Huang, Santa Clara, CA (US); Yahong Yao, San Jose, CA (US); Li Chen, San Jose, CA (US); Chih-Chang Chen, Cupertino, CA (US)

(73) Assignee: Siargo Ltd., Santa Clara, CA (US)

(*) Notice: Subject to any disclaimer, the term of this patent is extended or adjusted under 35 U.S.C. 154(b) by 532 days.

(21) Appl. No.: 17/330,269

(22) Filed: May 25, 2021

(65) Prior Publication Data

US 2022/0381716 A1  Dec. 1, 2022

(51) Int. Cl.
| | |
|---|---|
| G01N 25/18 | (2006.01) |
| G01F 1/68 | (2006.01) |
| G01F 1/684 | (2006.01) |
| G01F 1/69 | (2006.01) |
| G01F 1/692 | (2006.01) |
| G01F 1/699 | (2006.01) |
| G01F 15/14 | (2006.01) |

(52) U.S. Cl.
CPC ........... *G01N 25/18* (2013.01); *G01F 1/6845* (2013.01); *G01F 1/6847* (2013.01); *G01F 1/69* (2013.01); *G01F 1/692* (2013.01); *G01F 1/699* (2013.01); *G01F 15/14* (2013.01)

(58) Field of Classification Search
CPC ......... G01N 25/18; G01F 1/6845; G01F 1/69; G01F 15/14; G01F 1/6847; G01F 1/692; G01F 1/699
See application file for complete search history.

(56) References Cited

U.S. PATENT DOCUMENTS

| | | | | |
|---|---|---|---|---|
| 5,463,899 A | * | 11/1995 | Zemel | G01F 1/684 |
| | | | | 73/204.25 |
| 6,354,150 B1 | * | 3/2002 | Rudent | G01F 1/6847 |
| | | | | 73/202.5 |
| 6,681,625 B1 | * | 1/2004 | Berkcan | G01F 1/699 |
| | | | | 73/204.15 |
| 2001/0032503 A1 | * | 10/2001 | Schrittenlacher | G01F 1/699 |
| | | | | 73/204.11 |
| 2009/0016403 A1 | * | 1/2009 | Chen | G01F 1/6845 |
| | | | | 374/45 |
| 2012/0192642 A1 | * | 8/2012 | Speldrich | G01F 15/185 |
| | | | | 73/204.11 |
| 2017/0097252 A1 | * | 4/2017 | Huang | G01F 1/692 |

* cited by examiner

*Primary Examiner* — Randy W Gibson (57) ABSTRACT

The design and structure of a fluidic concentration metering device with a full dynamic range utilizing micro-machined thermal time-of-flight sensing elements is exhibited in this disclosure. With an additional identical sensing chip but packaged at the different locations in the measurement fluidic chamber with a closed conduit, the device can simultaneously measure the fluidic concentration and the fluidic flowrate. With a temperature thermistor integrated on the same micro-machined thermal sensing chip, the disclosed device will be able to provide the key processing parameters for the fluidic applications.

12 Claims, 5 Drawing Sheets

MICROMACHINED THERMAL TIME-OF-FLIGHT FLUIDIC CONCENTRATION METERING DEVICE

BACKGROUND OF THE INVENTION

1. Field of the Invention

This invention generally relates to fluid property measurement, and it particularly relates to a sensing device that applies for the measurement of fluidic or microfluidic concentration properties. This invention is further related to micro-machined thermal sensors or Micro Electro Mechanical Systems (MEMS) thermal flow sensing technology.

2. Description of the Related Art

There are many applications in fluidic and microfluidic handling and process control, particularly in energy, automotive, bioscience, pharmaceutics, and medical devices such as fuel cells, drug delivery, infusion, and in-vitro testing. For example, as of today, most of these processes are measured via a mechanical approach wherein the syringe pump for drug delivery is a typical example. There is a lack of necessary sensing capabilities for timely feedback as well. The downsides for mechanical delivery and process control approaches are usually with low measurement accuracy and not being able to acquire additional physical or chemical measurements of the fluids. For the diesel engine, the chemical property of the exhaust fluids is critical to the performance of the conversion for nitric oxide into nitrogen in addition to the diesel consumption efficiency.

There are quite a few approaches to measure the liquid concentration, such as electrochemical sensing which has a simple structure but it is easy to degrade with usage. In addition, electrochemical sensors have a very slow response time due to their measurement is depending on the electrochemical reactions, which is often very undesirable for the feedback control loop. Density meter or liquid chromatography can be used for the measurement as well but this instrument is bulky and very high cost, which will impose the limitation for applications. The other physical properties of gauge approaches such as viscosity, the sound of speed, and optical approaches are suffering from the issue of non-monotonic full dynamic range and hence only very limited data can be obtained. A proposal (US Patent Application No. 20020148284 by Baldauf M. et al., Method and device for determining a concentration of fluidic fuels for use in fuel cells) of measuring the specific heat of a water-based methanol solution and associate it with the methanol concentration requires a pump to maintain a constant flow speed, which is quite complicated. As of today, no effective commercial products are feasible for the scope and purpose.

Thermal calorimetry is used to measure the fluidic flow rate (e.g. U.S. Pat. No. 7,905,140 to Kanne U., Device with flow sensor for handling fluids.), but the constantly heating spot at the flow channel will cause instability for long term reliability. In addition, the flow rate measured via calorimetry is relied on the fluidic property, which often makes the calibration of the fluidic meter more challenging as many related applications would have binary or multiple components. The alternative sensing technologies such as MEMS Coriolis flow sensing devices (Spark, D. R., Smith R. T., and Najafi N., U.S. Pat. No. 7,921,737. Microfluidic device and method of operation) has also been applied for fluidic flow rate measurement. The micromachined Coriolis flow sensor does not require any heating mechanism therefore it eliminates the constant heat-induced drifting, but since the technology is based on the vibration of a tiny tube, environmental disturbance then became a big challenge to overcome. Lotters (Lotters, J. C., WO2015112009A1, Flow measurement system and method for determining at least one property of a flow medium,) disclosed to use a thin silicon nitride tube to replace the rigid tube such that the silicon nitride tube can be operating with a high frequency to prevent interference. However, in order to measure the physical properties of the fluids, additional sensors have to be integrated, which not only increases the sensor footage but leads to a high manufacturing cost, a complicated data process scheme, and a low device reliabilities.

One example of the requirement of the fluidic physical or chemical parameters is the drug infusion control wherein an alarm for a mistaken drug would critically help to reduce drug infusion accidents. Hence new fluidic or microfluidic sensing products that can address these issues are urgently demanded. A microfluidic channel with integrated but yet exposed electrodes as sensing elements taught by Shih J. et al (U.S. Pat. No. 10,400,759, Flow sensor with modular microfluidic channels and methods of manufacture) could be used to sense the fluidic properties. But the embodiment requires the electrodes to be in direct contact with the fluid, and the generated electrochemical pulses will alter the fluid ionic properties such as pH values. Although these alterations could be minimized, any such changes would be undesirable for medical and pharmaceutical applications. Meanwhile, the change of the impendence would not effectively associate to the actual drug properties, but more an alternative approach for flow rate measurement.

An additional example is fuel cell energy efficiency. In such a case, measurement of methanol flow rate or consumption and the corresponding chemical concentration and density are critical for the performance. However, current technologies are yet to offer a simple and effective solution. Therefore, it is desired to have a fluidic measurement device that will be able to solve the above technical difficulties while providing a simple approach without the requirement of excessive process and multiple devices to be implemented. The device will integrate both the flow rate measurement sensor as well as fluidic chemical sensing elements to measure the fluidic consumption and fluidic chemical concentration simultaneously. The capability will extend to the flow media density measurement such that the accuracy for flow media with variable densities can be significantly improved, and it is also critical to have a large measurement dynamic range. To achieve this objective, the present invention will disclose a new fluidic device design that will be able to measure the fluidic flowrate or consumption as well as the fluidic concentration using integrated sensors while having the capability of measuring density of the fluids. Such a design and configuration will output highly accurate and reliable metrology data as no additional devices will be required. The fluidic device will further be able to operate at low power with capability of battery power supply and all state-of-the-art electronics for data safety and networking.

SUMMARY OF THE INVENTION

It is the objective of the present disclosure to provide the design and structure of a fluidic device that can have the capability for fluidic flow rate metering as well as the capability for fluidic concentration and density. The fluidic concentration device will have an enclosed conduit for the flowing fluid to pass through. A micro-machined thermal time-of-flight sensor will be placed at the wall of the fluidic channel on which multiple sensing elements can be combined for the measurement of the desired fluidic dynamic range. Another thermal diffusivity sensor will be placed in the same fluidic channel but positioned inside a recess from the channel wall where the surface of the sensor will not be in direct contact with the fluidic velocity profile. This configuration will allow the diffusivity measurement not to be influenced by the fluidic flow and therefore the fluidic concentration can be deduced simultaneously while the fluidic flow rate is being measured. The thermal time-of-flight sensor will acquire both the thermal convection in the time domain and the thermal conduction in the frequency domain for the fluids of interest.

In several embodiments, the disclosed fluidic concentration metering device with the micro-machined sensing elements will measure the fluidic flow rate as well as the fluidic concentration simultaneously such that a chemistry-related process can be fully controlled. For example, an energy cell device application is using methanol as the fuel supply, both the consumption and the concentration of methanol are critical for the efficiency of the device. A single device capable of measuring both kinds of information will significantly simplify the process control in the feedback loop to enhance the device system performance and reduce the cost. An additional example is the exhausted fluid for a diesel engine where the methanol concentration is critical for the reaction needed to convert the nitric oxides gas into nitrogen gas. The control of the mixing tank for supplying to the exhausted fluid container will require instant feedback of the chemical concentration and the consumption rate at the conversion process. To reduce the interference and the response time, the preferred embodiment will have two sensing chips packaged in the same conduit passage. One sensing chip will measure the flow rate or the fluidic consumption in volume or weight and another sensing chip will metering the fluidic concentration. The sensing chip for concentration will be preferred to be placed inside a chamber that has direct contact with the flowing fluid while the speed of the fluid will not impact the concentration measurement. Such a chamber can be a shallow recess inside the conduit wall, and preferably at the top of the channel such that the concentration exchange can be more efficient and timely.

In another preferred embodiment, the disclosed fluidic concentration metering device with the dual-sensing chips in a closed conduit will be able to have an extended or full measurement dynamic range compared to those by the current technologies. For the current available state-of-the-art concentration or density measurements are often limited to the lower measurement range such as 0~30%. This was due to either the non-monotonic behavior or the data processing limits. In this disclosure, the thermal diffusivity is monotonical with the increasing of the fluidic concentration in the full dynamic range and therefore it will provide a better solution for variety of applications. Further, the acquired time-of-flight data can be independent of the fluidic concentration with dual or multiple sensing elements at the downstream to cancel out the differences in the thermal responses because of the fluidic concentration, and the simultaneously acquired amplitude data will be direct measurement of the fluidic concentration. By comparison of these two sets of data, it can perform a self-cross calibration with respect to the environmental factor resulting in much-improved precision of the measurement.

In another preferred embodiment, the disclosed fluidic concentration metering device with the dual-sensing chips in a closed conduit will have the sensing chips that are micro-machined with the MEMS process. The sensing chips will be operating with thermal sensing principles. Each chip will have multiple sensing elements while a microheater is placed on the center of the chip with sensing elements symmetrically placed for the concentration measurement, and asymmetrically for the flow measurement. In the present disclosure, the micro-machined sensing elements are made on a millimeter dimension glass substrate with a thermal isolation cushion for better response and performance. The sensing elements are further made on a localized cushion on the glass substrate with a sub-millimeter dimension of channel size. In most of the cases, the present disclosure has the closed conduit configured in the circular pipe such that it shall remove the sharp corners that can lead to fluidic cavitations and add unpredictable measurement errors or uncertainties.

In another preferred embodiment, the disclosed fluidic concentration metering device with the dual-sensing chips in a closed conduit will have a temperature sensing element integrated on the same sensing chip substrate such that the temperature sensor can be calibrated at the same time while the other thermistors on the glass substrate are calibrated. The independent temperature sensor or thermistor will be used to measure the temperature of the fluid during the operation of the fluidic concentration metering device. For most of the liquids, the density is not dependent on the pressure applied to the fluids unless a high-pressure threshold is passed. However, the density or the concentration of the fluidic is quite sensitive to the temperature change, and in most cases, it is linearly dependent with the temperature, the temperature information of the fluids will then be a critical value for the process control where the fluidic concentration or density is a critical value.

In another preferred embodiment, the disclosed fluidic concentration metering device with the dual-sensing chips in a closed conduit will have the capability for the derivation of the fluidic density from the acquired time-of-flight and amplitude data. This capability is particularly important in case there could be some gas cavitation existing. For a well-mixed fluid and under constant pressure, the concentration value is in correlation with the density value solely, however, if some tiny gas bubble or non-dissolvable gas in the fluid, the density value may be deviated from concentration value. In the present disclosure, the time-of-flight data are more sensitive to the changes in density while the amplitude data will be closer in association with the concentration property. Therefore, by comparison of these two acquired data, it could determine whether the fluid under measurement is cavitated. This will also help improve the fluid flow metrology accuracy wherein there would be a variation of the fluid density such as in the gas dissolution process.

In yet another preferred embodiment, the disclosed fluidic concentration metering device with the dual-sensing chips in a closed conduit that has an inert plastic such as PEEK (polyetheretherketone) enclosure, or Teflon enclosure to provide the biocompatibility and resistive to any chemical reactions. A meter head is preferred to provide housing spaces for the electronics of signal conditioning, data processing, user's interface and data communication. The meter head is further preferred to be fabricated by metal or engineering plastic materials for robustness, and it can be easily separated from the meter for use of applications which disposable measurement is necessary.

The present disclosure provides a new design of a fluidic concentration metering device that can substantiate it from the conventional ones with full dynamic measurement range, high resolution, and the capability of acquiring the dual-sensing data simultaneously for concentration and density measurement or self-cross calibration with simpler configuration and the disposable options. The disclosure, in particular, can provide accurate metrology data for fluid while acquiring the concentration and/or density data of the fluids which provide a desired solution for applications such as fuel cell, diesel engine exhaust management, and beverage or related applications. These and other objectives of the present disclosure will become readily apparent upon further review of the following drawings and specifications. And additionally, for those with the knowledge of the art, the fluidic concentration metering device could be further utilized for multiphase data acquisition.

DETAILED DESCRIPTION OF THE PREFERRED EMBODIMENTS

Figure 1:
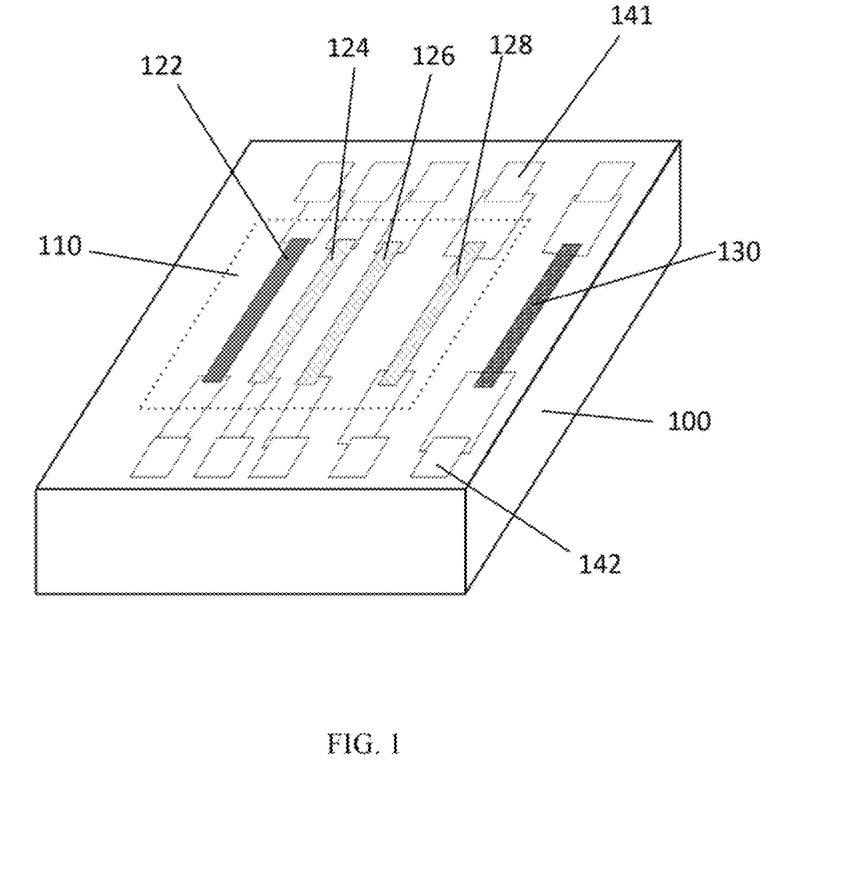
FIG. 1 is the preferred schematic of the micro-machined fluidic concentration sensor chip on a glass substrate.

The schematic of the micro-machined thermal time-of-flight sensing chip (100) for fluidic concentration metering is exhibited in FIG. 1. The sensing chip is preferred to be made on a glass or Pyrex substrate in which a thermal isolation cushion (110) is made via deposition of thermally isolated and fluidic insert or compatible materials such as parylene followed by the patterning and etching to define the isolation cushion area. A low-stress silicon nitride and silicon oxide combo films in micrometer thickness are used for the interface layer for the thermistors (122, 124, 126, and 128) that allow the thermal time-of-flight sensing to be applied to the fluidic concentration sensing as well as flow rate measurement. These thermistors are preferred to be made of high temperature coefficient of resistivity (TCR) materials such as platinum, nickel, or doped polycrystalline silicon by standard semiconductor process approaches. Each of the thermistors should have a narrow linewidth for better thermal response and time resolution. The line width is preferably within 4 µm. In the preferred embodiment, the thermistor (122) is used as the microheater. A modulated temperature waveform such as a sine waveform is applied to this thermistor during measurement. The pair of the thermistors (124 and 126) is used to measure the fluidic concentration in the zero flow condition. This pair of thermistors can also be used to measure the flow rate by combining with another thermistor 128. An extra high measurement dynamic range can be achieved. When these thermistors are used for flow rate measurement, they will be placed downstream to the flow direction, and the time difference or phase shift registered on these thermistors are the measures of the heat transfer by the flow medium. The distance for each of these two thermistors to the microheater is preferred not to be the integer times to each other. The gas flow velocity, V, to be measured concerning the temperature-time (T, t) transient in this arrangement will be depending on the thermal diffusivity (D) and the forced convection equation:

$$\frac{\partial T}{\partial t} = D\nabla^2 T - V\nabla T \quad (1)$$

Therefore, at the static condition or V=0, i.e. if the sensing chip is placed at the measurement chamber where a static condition can be always maintained, the thermal diffusivity of the fluid can be measured. The thermal diffusivity will be directly related to fluidic properties such as the concentration, which is especially eligible for binary fluids mixed contents, such like the case of for methanol mixing with water for the application of methanol fuel cell application. By correlating the measured thermal diffusivity to the premixed concentration, the methanol concentration in water can be obtained. In another example for metering the urea concentration for the diesel engine exhaust nitric oxygen removal, metering the urea concentration in water at 32.5% would be critical for the nitric oxygen removal efficiency. The current approach, therefore, provides a simple solution for such applications.

For the flow rate measurement with the same sensing chip, on the other hand, from equation (1), if only one thermistor at downstream, the measurement fluid flow velocity will be always associated with the fluid thermal properties, and therefore when the fluidic property (such as the concentration) changes, the measured flow velocity will also change. However, with the two thermistors at different distances $d_i$ to the microheater, each of the thermistors will sense a different thermal value via the measurement of the transient time and the amplitude. By solving the equations for the measured values from each thermistor, the dynamical unknown and measurement depending on thermal diffusivity will be canceled out and the fluidic property which is independent of flow velocity in the closed conduit flow channel can be obtained:

$$V \sim (d_i - \sqrt{4D\ln(t_i^{-0.5}/T)})/t_i \quad (2)$$

The capability of acquiring a fluidic property independent of flow rate is very critical for the flow medium that may have varying fluidic properties like concentrations. Otherwise, the fluidic consumption in the monitored process would have large uncertainties which are detrimental to the process control. The additional thermistor 128 allows the measurement for large dynamic range, as at the low-speed flow, the distance that the heat transfer will be limited that requires the thermistor to be placed at the shorter distance to the microheater while for high-speed flow, the heat transfer can reach to large distance but the resolution at the short distance may not be able to resolve. Hence the combination of these thermistors at the different distances will not only help the removal of the fluid properties but also will offer a better fluid flow measurement dynamic range.

The thermistor (130) on the substrate of the sensing chip is used to measure the fluidic temperature for providing the control of the heating scheme for the microheater and is preferred to be made of the same materials as the thermistors for thermal time-of-flight sensing elements. The temperature data is very critical to the measurement as the concentration property is very sensitive to the temperature. The combined information will allow the control of the process more efficient. The thermistor (130) is preferred to be made with the same materials as the other thermistors for easier management in the calibration process.

Figure 2:
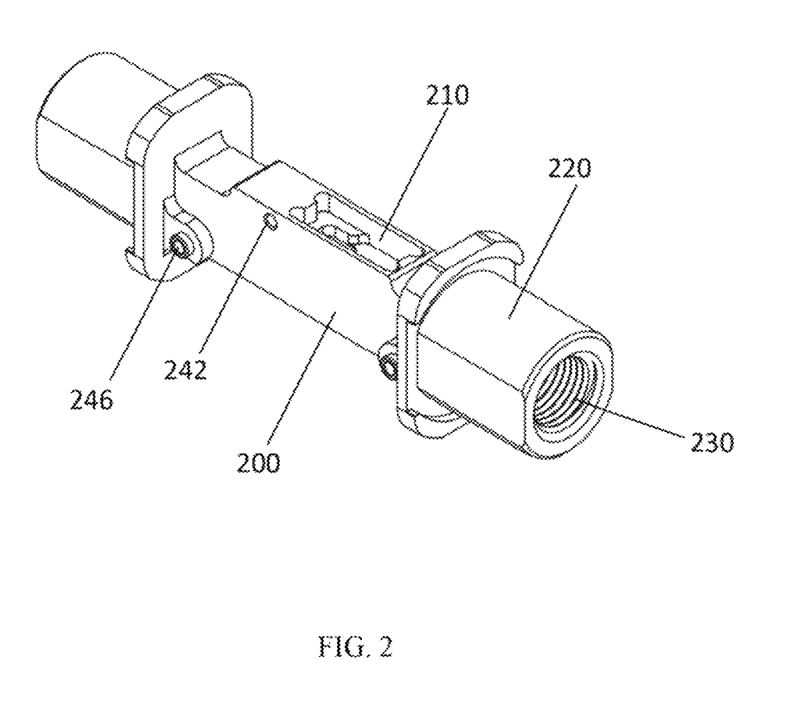
FIG. 2 is the design of the fluidic concentration measurement body containing the measurement chamber and fluidic channel.

For the preferred embodiment, the present invention discloses a new fluidic concentration metering device with the dual-sensing chips in a closed conduit that utilizes a micromachined thermal time-of-flight sensor to measure the fluidic concentration and optionally the fluidic flowrate. The disclosure has three crucial improvements to the existing technologies. First, it provides a simple configuration that can be applied for a wide spectrum of applications, secondly, it offers the full dynamic range measurement with high accuracy and sensitivity. The integrated temperature sensor also provides the critical information for the precise processing control as the concentration is dependent on the temperature, and thirdly it a miniaturized, cost-effective option, and can be configured for disposable applications as well. FIG. 2 is one embodiment of the fluidic concentration measurement chamber (200) for the disclosed device. The chamber is preferred to be made of inert, chemical and biochemical compatible materials such as polyetheretherketone (PEEK), Teflon, or stainless steel. It is preferably in a closed conduit formality such that the flowrate or fluidic consumption can be simultaneously measured. The cavity (210) is to house the sensor chips (either concentration sensor chip or the combined concentration and flow rate sensor chips) and provide the interface to the control electronics. This cavity will be open to the closed conduit or the fluidic flow channel such that the sensor chips can be placed in proximity to the fluid to be measured. The connectors (220) of the chamber are preferred to have a female threaded formation (230) that allows the easy adaption to any other formatted connectors. The format is also easy for leakage-proof sealing. The installation hole (242) is used to fix the electronic control printed circuitry board and the other installation holes (246) are made for the enclosure fixture.

Figure 3A:
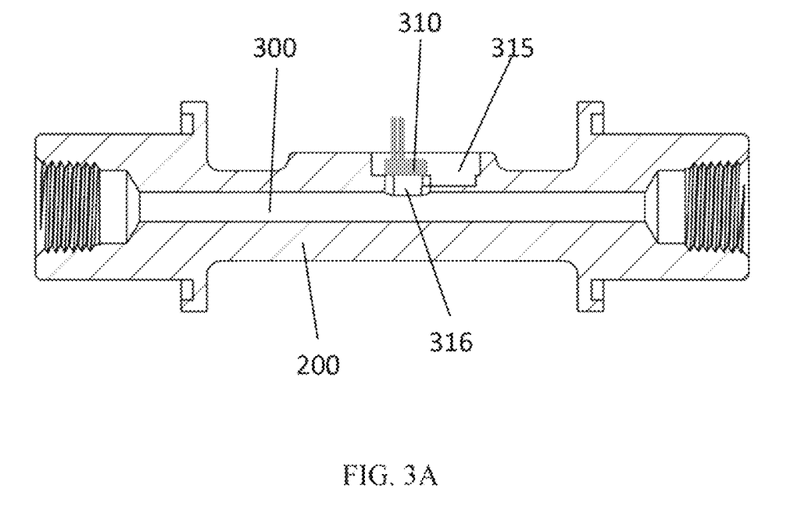
FIG. 3A is the cross-section of the measurement body showing the concentration sensor position inside the measurement chamber.

FIG. 3A is an exhibition of an embodiment of the cross-section of the fluidic measurement chamber (200). The chamber has a fluidic channel (300) that allows the measurement fluid to flow through or at the channel is fully filled with the fluid to be measured in a static state. The fluidic concentration measurement sensor chip (310) is placed inside a cavity (315). This cavity has an opening on its top that will be accessed by the control electronic printed circuitry for signal acquisition, while the bottom of the cavity is opened to the fluidic channel. The fluidic concentration measurement sensor chip will not be placed inside the fluidic channel but at an elevated position where a fluidic exchange space (316) is kept between the sensor sensing surface and the wall of fluidic flow channel. Although in the laminar flow regime, the fluidic flow speed at the wall of fluid flow channel is null, the fluidic at turbulence or transitional regime, the fluid flow speed will not be non-trivial. Therefore, to ensure the sensor sensing surface is in contact with the fluid that is at the static state, and the fluidic exchange efficiency between the fluid exchange space and the fluidic flow channel, the depth of the fluidic exchange space from the flow channel wall will be preferred to keep within 5 mm but not smaller than 1 mm. The fluid concentration sensor in FIG. 1 acquires the diffusivity of the fluid which is further correlated to the fluidic concentration or density during the calibration with the recognized fluids. The fluidic concentration sensor housing cavity (315) is preferred at the top position of the fluid flow channel as the fluid will diffuse to each other between the exchange space and the fluidic flow channel if there is a concentration (density) difference between them. The concentration sensor in this configuration can also provide the insurance for a full-filled channel. In case the channel is not fully filled with fluid, the sensor sensing surface will be in contact with air or other gases if the channel is pre-filled with a specific gas before the fluid starts to flow inside the fluid flow channel. The thermal conductivity that the sensor senses will alarm the user for attention.

Figure 3B:
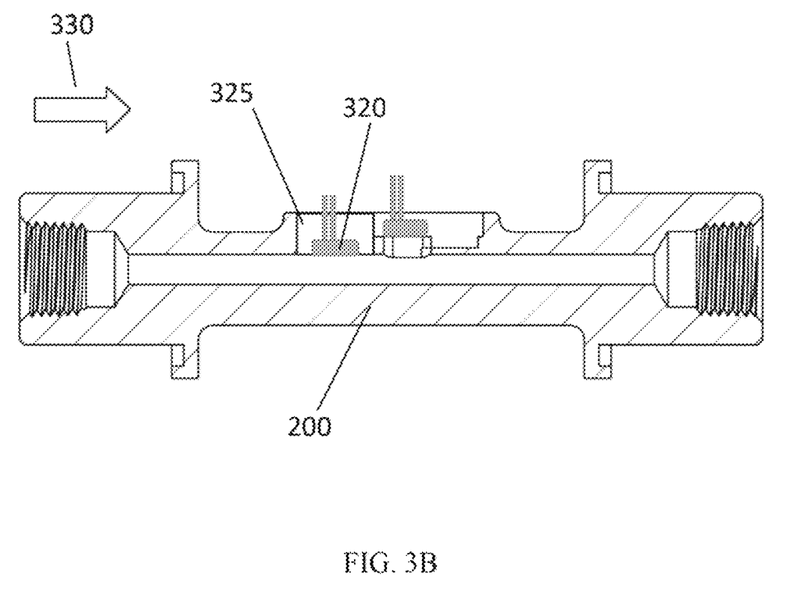
FIG. 3B is an improved embodiment where a flow sensor is placed in a flow measurement chamber such that both fluidic concentration and fluidic flow rate can be acquired at the same time.

For the case the measurement of fluid concentration and fluid flow rate are both desired in the process monitoring or control, the preferred embodiment is exhibited in FIG. 3B. While the concentration sensor is kept at the same configuration, a fluid flow rate sensor (320) will be placed in the adjacent cavity (325). In the preferred embodiment, the fluid flow rate sensor will be the one described in FIG. 1 that is operating with the thermal time-of-flight sensing principle. The thermal time-of-flight sensor has a modulated microheater and at least two of the independent thermistors located downstream to the microheater. This configuration will allow the acquired fluid flowrate to be pure volumetric and independent of the fluid concentration which is critical for the fluidic consumption measurement. In the preferred embodiment, the fluid flow rate measurement sensor chip will be placed at the fluid channel wall with its surface immersed into the fluid but not more than 2 mm in depth to maintain the boundary layer conditions when the fluid flowing over the sensor chip. In addition, the fluid flow rate sensor chip will be preferably placed upstream of the concentration sensor chip such that the flow profile will not be influenced by the space for fluidic concentration exchange. The preferred fluid flow direction is indicated by the arrow (330) that will be placed on the out surface of the finished fluidic concentration meter enclosure.

Figure 4:
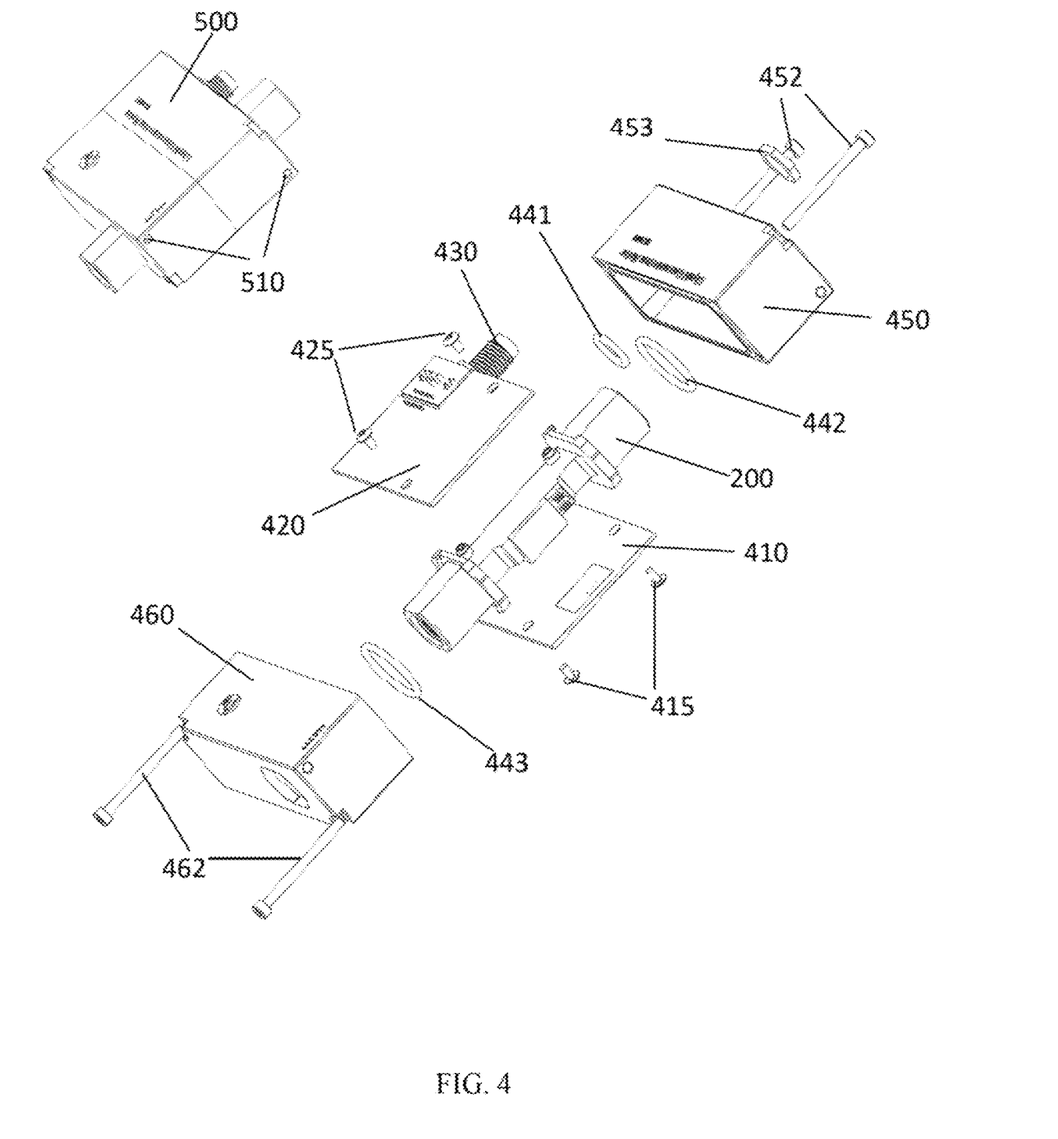
FIG. 4 is an example of the explosive view of the assembly of the said fluidic concentration device.

For the preferred embodiments, the detailed embodiment of the assembly of the fluid concentration metering device is shown in FIG. 4. In this explosive view, the final assembled metering device (500) is decomposed into its constituents. The metering device is preferred to have two electronic printed circuitry boards. One (410) is fixed to the metering device measurement body (200) by the screws (415) and it is used for acquiring, digitizing, amplifying, and processing the data from the sensing elements housed in the measurement body. This printed circuitry board will also have data storage chips that can be programmed for the time intervals when the data will be kept onboard which will ensure the ultimate data safety. Another printed circuitry board (420) is fixed to the measurement body via screws (425) and is used for the wired or wireless data communication. The electrical interface (430) is for wired data cable connection and it is also used during the device calibration and local data retrieval. The interface also supplies the power to the measurement device. After the printed circuitry boards are assembled to the measurement body, several rubber gaskets (441, 442, and 443) are used to seal the measurement body enclosure from liquid attack. The enclosure in this embodiment is composed of two parts, 450 and 460, and are fixed with screws (452 and 462). The screw (453) is used to fix the electrical interface (430). For assistance to the installation, two installation ports (510) with customized threads are made on the bottom of the said fluidic concentration measurement device.

Figure 5A:
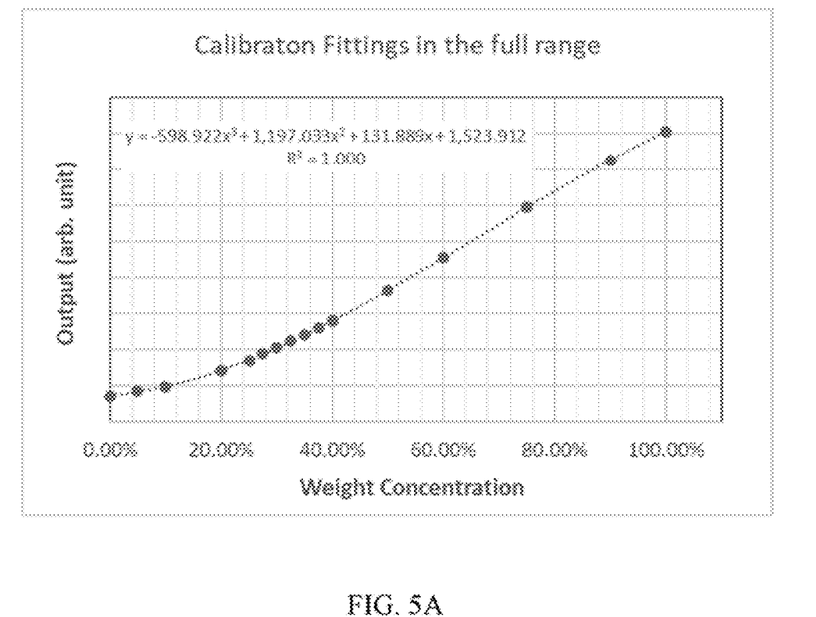
FIG. 5A is the raw data acquired from the micromachined fluidic concentration sensor.
Figure 5B:
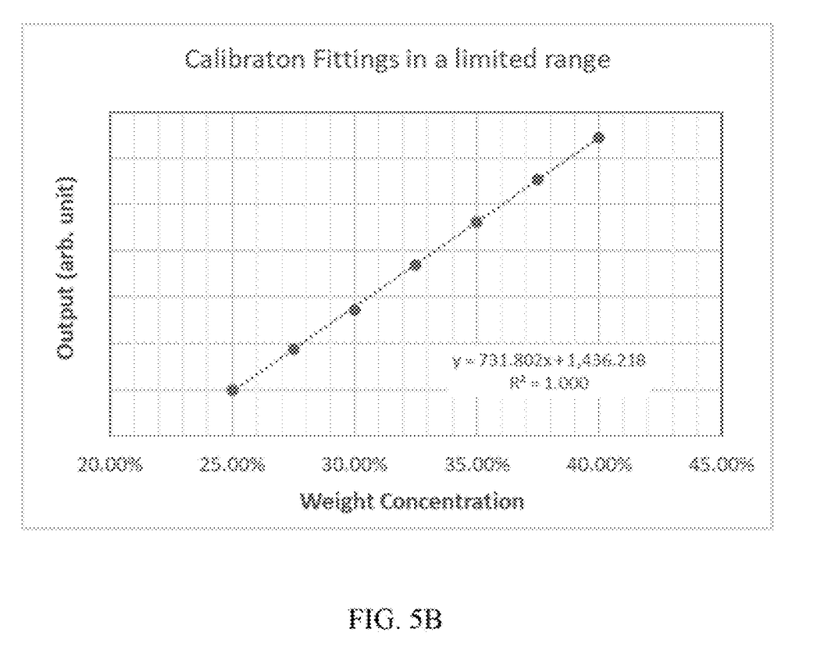
FIG. 5B is the regression data calculated by the raw data.

For the preferred embodiment, the data acquired from the fluidic concentration measurement device is exhibited in FIG. 5A. The embodiment shown for methanol concentration in water can be best fitted with the third order of a polynomial in the full dynamic range. Most of the fluids such as isopropyl alcohol or urea in water can be fitted with this function. In some applications such as exhaust fluid for diesel engines, only a limited range of the concentration is of interest. The fitting can be reduced to a linear function (FIG. 5B) for obtaining the same accuracy. Therefore, the calibration cost can be significantly reduced.

For the preferred embodiment, the fluidic density is solely correlated to the fluidic concentration. Therefore, the fluidic concentration metering device can also be used for the fluidic density measurement once it is calibrated. For the same reason, the fluidic concentration or density is more sensitive to temperature variations. The temperature sensor integrated on the fluidic concentration or flowrate sensing chip in FIG. 1 will also output the real and instant fluidic temperature which will be critical for some applications. Although these parameters are also dependent on the fluidic pressure, they are less sensitive to pressure changes. For most applications, the fluidic pressure is a constant or nearly a constant. Hence, the fluidic concentration metering device will provide the key parameters for the applications.

For the additional preferred embodiment, the fluidic concentration metering device for those in the art shall become readily and apparently. It will also be readily and apparently that the fluid applied will not be limited to the fluids with two components but also for the mixture containing multiple fluids as long as the fluids are homogeneously mixed with a characteristic thermal diffusivity.

The invention claimed is:

1. A fluidic concentration metering device utilizing a micro-fabricated sensor based on thermal time-of-flight sensing principle with a capability to metering a full dynamic concentration range comprising:
   A fluidic concentration measurement chamber having a fluidic channel that is in a form of a closed conduit and guiding a fluid to be measured;
   A micro-machined thermal time-of-flight sensing chip that is used to metering thermal diffusivity of the fluid;
   A cavity inside the fluidic concentration measurement chamber, wherein the cavity is connected to the fluidic channel and providing a housing space for the micro-machined thermal time-of-flight sensor chip;
   An additional thermistor integrated on the micro-machined thermal time-of-flight sensing chip for a local fluidic temperature measurement;
   A recess space between the sensor chip surface and a wall of the fluidic channel, which makes the fluid under a thermal diffusivity measurement at a static state;
   A printed circuitry board for the signal conditioning, data processing, and user interface electronics; and
   A meter enclosure which is used to housing all components into a complete and stand-alone fluidic concentration metering device, wherein the housing enclosure meets safety requirements for the industrial application domain.

2. The fluidic concentration metering device of claim 1 wherein an inlet and outlet of the fluidic channel are having female thread connectors, the fluidic channel guides the fluid to be measured and is made with biochemical inert materials selected from the group consisting of polyetheretherketone (PEEK), Teflon, or stainless steel for better fluid biocompatibility.

3. The fluidic concentration metering device of claim 1 wherein the fluidic channel has a cavity to house the fluidic concentration sensor chip, the cavity is connected to the fluidic channel and is placed on top of the fluidic channel.

4. The fluidic concentration metering device of claim 1 wherein the cavity will have a recess space between top surface of the sensing chip and the fluidic channel wall, fluidic concentration inside the recess space will get exchanged with the fluid inside the fluidic channel and maintain the fluid under measurement at the static state, dimension of the recess space between surface of the sensing chip and the fluid channel wall is within 5 mm, but.

5. The fluidic concentration metering device of claim 1 wherein the micro-machined thermal time-of-flight sensing chip is made on a glass substrate and will have a thermistor as a micro-heater and have another multiple thermistors as sensing elements to downstream of the micro-heater, underneath the microheater and the sensing elements, a thermally isolated cushion made of parylene film of 7~20 μm, each sensing element will be made of insert metals with high-temperature coefficients selected from the group consisting of platinum or nickel, or CMOS compatible materials consisting of doped polycrystalline silicon, surface of the sensing elements will be passivated with high thermal conductive materials selected from the group consisting of silicon nitride or silicon carbide, distances between the microheater and each of the sensing elements is to be within a few tens of micrometers, and to have the nearest sensing element at 20~40 μm, the second sensing element is at 60 to 120 μm.

6. The fluidic concentration metering device of claim 1 wherein the micro-machined thermal time-of-flight sensing chip is to have an independent and separate thermistor on the chip substrate for the measurement of the local temperature of the fluid.

7. The fluidic concentration metering device of claim 1 wherein the micro-machined thermal time-of-flight sensing chip is calibrated to both air and fluid thermal conductivity such that when the fluid inside the fluidic channel is not full and the sensing chip surface is not in close contact with the fluid to be measured, an alarm will be transmitted to users for attention.

8. The fluidic concentration metering device of claim 1 wherein the micro-machined thermal flow sensing chip has a capability to relay data for local digitizing, processing, storing, and transmission via wired or wireless communication protocols.

9. The fluidic concentration metering device of claim 1 wherein the meter enclosure will house the fluidic concentration measurement chamber, printed circuitry boards for signal conditioning, data process, and user interface electronics, the meter enclosure will also have a pre-made installation fixture and will be in compliance with the ingress protection (IP) rating of 67 requirements, or to be in compliance with IP68 requirements.

10. The fluidic concentration metering device of claim 1 wherein the fluidic channel will have a second cavity that is for housing a second sensing chip with identical structure of the micro-machined fluidic concentration sensing chip, the second sensing chip is however used for a flow rate measurement of the fluid passing through the fluidic channel.

11. The fluidic concentration metering device of claim 10 wherein the second cavity will connect to the fluidic channel, the second sensing chip will be in direct contact with the fluid inside the fluidic channel, surface of the second sensing chip will protrude into the fluid inside the fluidic channel but the depth from the fluid channel wall will be within 2 mm, the second cavity is placed in upstream to first cavity to allow a better stable flowrate measurement.

12. The fluidic concentration metering device of claim 10 wherein the second sensing chip will work based on the thermal time-of-flight flow sensing principle with one microheater and multiple sensing elements in downstream to the microheater, thermal time-of-flight signals measured from the multiple sensing elements can be used to deduce fluidic concentration-related thermal properties which are independent from flowrate measurement.

* * * * *